(12) United States Patent
Walker et al.

(10) Patent No.: US 12,093,565 B2
(45) Date of Patent: *Sep. 17, 2024

(54) MEMORY PROTOCOL

(71) Applicant: Lodestar Licensing Group LLC, Evanston, IL (US)

(72) Inventors: Robert M. Walker, Raleigh, NC (US); Frank F. Ross, Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/575,878

(22) Filed: Jan. 14, 2022

(65) Prior Publication Data
US 2022/0137882 A1 May 5, 2022

Related U.S. Application Data

(63) Continuation of application No. 16/812,719, filed on Mar. 9, 2020, now Pat. No. 11,226,770, which is a
(Continued)

(51) Int. Cl.
*G06F 3/06* (2006.01)
*G06F 13/16* (2006.01)
*G06F 13/42* (2006.01)

(52) U.S. Cl.
CPC .......... *G06F 3/0659* (2013.01); *G06F 3/061* (2013.01); *G06F 3/0656* (2013.01);
(Continued)

(58) Field of Classification Search
CPC ...... G06F 3/0659; G06F 3/061; G06F 3/0656; G06F 3/0679; G06F 13/16; G06F 13/4234; G06F 13/1626
See application file for complete search history.

(56) References Cited

U.S. PATENT DOCUMENTS 5,452,311 A   9/1995   Wells et al.
5,574,944 A   11/1996  Stager
(Continued)

FOREIGN PATENT DOCUMENTS

TW   201314437 A    4/2013
WO   2010002753 A1  1/2010
(Continued)

OTHER PUBLICATIONS

International Search Report and Written Opinion from international patent application No. PCT/US2017/034487, dated Oct. 25, 2017, 22 pp.
(Continued)

*Primary Examiner* — Arpan P. Savla
*Assistant Examiner* — Edmund H Kwong
(74) *Attorney, Agent, or Firm* — Brooks, Cameron & Huebsch, PLLC

(57) ABSTRACT

The present disclosure includes apparatuses and methods related to a memory protocol. An example apparatus can execute a read command that includes a first chunk of data and a second chunk of data by assigning a first read identification (RID) number to the first chunk of data and a second RID number to the second chunk of data, sending the first chunk of data and the first RID number to a host, and sending the second chunk of data and the second RID number to the host. The apparatus can be a non-volatile dual in-line memory module (NVDIMM) device.

20 Claims, 3 Drawing Sheets

Related U.S. Application Data continuation of application No. 15/366,504, filed on Dec. 1, 2016, now Pat. No. 10,585,624.

(52) U.S. Cl.
CPC ............ *G06F 3/0679* (2013.01); *G06F 13/16* (2013.01); *G06F 13/4234* (2013.01)

(56) References Cited

U.S. PATENT DOCUMENTS

| | | | |
|---|---|---|---|
| 5,590,345 | A | 12/1996 | Barker et al. |
| 5,774,683 | A | 6/1998 | Gulick |
| 5,937,423 | A | 8/1999 | Robinson |
| 6,559,850 | B1 | 5/2003 | Strongin et al. |
| 7,711,889 | B2 | 5/2010 | Kudo et al. |
| 7,904,644 | B1 | 3/2011 | Pinvidic et al. |
| 7,924,521 | B1 | 4/2011 | Hudiono et al. |
| 7,983,107 | B2 | 7/2011 | Moshayedi et al. |
| 8,719,492 | B1 | 5/2014 | Asnaashari |
| 8,769,192 | B2 | 7/2014 | Yeh |
| 8,874,831 | B2 | 10/2014 | Lee et al. |
| 9,128,634 | B1 | 9/2015 | Kang et al. |
| 9,183,078 | B1 | 11/2015 | Zhu et al. |
| 2003/0110322 | A1 | 6/2003 | Wolrich et al. |
| 2004/0148482 | A1 | 7/2004 | Grundy et al. |
| 2004/0260908 | A1 | 12/2004 | Malik et al. |
| 2007/0113000 | A1 | 5/2007 | Murin et al. |
| 2007/0283217 | A1 | 12/2007 | Gorfajn et al. |
| 2008/0082751 | A1 | 4/2008 | Okin et al. |
| 2008/0189452 | A1 | 8/2008 | Merry et al. |
| 2008/0195800 | A1 | 8/2008 | Lee et al. |
| 2008/0304479 | A1* | 12/2008 | Scott ................. H04L 47/10 370/389 |
| 2009/0006787 | A1 | 1/2009 | De Souza et al. |
| 2009/0164869 | A1 | 6/2009 | Chuang |
| 2009/0276556 | A1 | 11/2009 | Huang |
| 2010/0250827 | A1 | 9/2010 | Jullien et al. |
| 2011/0170346 | A1 | 7/2011 | Nagai et al. |
| 2011/0252205 | A1* | 10/2011 | Rege ................. G06F 12/0868 711/E12.001 |
| 2011/0268256 | A1 | 11/2011 | Ootsuka |
| 2011/0320651 | A1 | 12/2011 | Poublan et al. |
| 2012/0020161 | A1 | 1/2012 | Haukness |
| 2012/0131253 | A1 | 5/2012 | McKnight et al. |
| 2012/0159052 | A1 | 6/2012 | Lee et al. |
| 2013/0019057 | A1 | 1/2013 | Stephens |
| 2013/0151741 | A1 | 6/2013 | Walker |
| 2013/0262745 | A1 | 10/2013 | Lin et al. |
| 2013/0262761 | A1 | 10/2013 | Oh |
| 2014/0013062 | A1* | 1/2014 | Matsukawa ............ G06F 12/00 711/154 |
| 2014/0032850 | A1* | 1/2014 | Phelan ................ G06F 12/0873 711/135 |
| 2014/0082120 | A1* | 3/2014 | Ma .......................... G06F 15/16 709/213 |
| 2014/0082267 | A1 | 3/2014 | Yoo et al. |
| 2014/0229699 | A1 | 8/2014 | Gurgi et al. |
| 2014/0269088 | A1* | 9/2014 | Pichen ................... G11C 16/32 365/185.18 |
| 2014/0351492 | A1 | 11/2014 | Chen |
| 2014/0372658 | A1 | 12/2014 | Safranek et al. |
| 2015/0012687 | A1 | 1/2015 | Huang |
| 2015/0052318 | A1 | 2/2015 | Walker |
| 2015/0212738 | A1 | 7/2015 | D'eliseo et al. |
| 2015/0234601 | A1 | 8/2015 | Tsai et al. |
| 2015/0279463 | A1 | 10/2015 | Berke |
| 2015/0331638 | A1 | 11/2015 | Zaltsman et al. |
| 2015/0363106 | A1 | 12/2015 | Lim et al. |
| 2016/0026577 | A1 | 1/2016 | Goodwin |
| 2016/0041907 | A1 | 2/2016 | Jung et al. |
| 2016/0070483 | A1 | 3/2016 | Yoon et al. |
| 2016/0118121 | A1 | 4/2016 | Kelly et al. |
| 2016/0232112 | A1 | 8/2016 | Lee |
| 2016/0291884 | A1 | 10/2016 | Halaharivi et al. |
| 2016/0306566 | A1 | 10/2016 | Lu |
| 2016/0321010 | A1 | 11/2016 | Hashimoto |
| 2016/0357462 | A1* | 12/2016 | Nam ...................... G06F 3/0613 |
| 2017/0255575 | A1 | 9/2017 | Niu et al. |
| 2017/0308306 | A1 | 10/2017 | Intrater |
| 2017/0351433 | A1 | 12/2017 | Walker et al. |
| 2018/0059944 | A1* | 3/2018 | Helmick ............ G06F 11/1048 |
| 2018/0059945 | A1 | 3/2018 | Helmick et al. |
| 2018/0260329 | A1 | 9/2018 | Galbraith et al. |
| 2019/0129656 | A1 | 5/2019 | Bains et al. |

FOREIGN PATENT DOCUMENTS

| | | |
|---|---|---|
| WO | 2013007870 A1 | 1/2013 |
| WO | 2015116468 A1 | 8/2015 |
| WO | WO-2017056219 A1 * | 4/2017 |

OTHER PUBLICATIONS

International Search Report and Written Opinion from international application No. PCT/US2017/029780, dated Jul. 18, 2017, 11 pp.
Office Action from Taiwanese patent application No. 106114938, dated Jan. 18, 2018, 7 pp.
International Search Report and Written Opinion from related international application No. PCT/US2017/063581, dated Mar. 19, 2018, 13 pp.
Decision of Rejection from Taiwanese patent application No. 106114938, dated May 24, 2018, 6 pp.
Office Action from related Taiwanese patent application No. 106118556, dated May 11, 2018, 10 pp.
Office Action from related Taiwanese patent application No. 106142145, dated Dec. 12, 2018, 16 pp.
Search Report from European patent application No. 17793026.0, dated Mar. 13, 2019, 7 pp.
Office Action from Chinese patent application No. 201780026941. 4, dated Jul. 10, 2019, 12 pp.
Shah, Agam, "What's in HPE's Persistent Memory?" PCWorld, Apr. 1, 2016, https://www.pcworld.com/article/3051133/whats-in-hpes-persistent-memory.html.
Perepelitsa, Costya, Quora, "Why do we use Registers Instead of Memory?", 2015, https://www.quora.com/Why-do-we-use-registers-instead-of-memory.
Search Report from related European patent application No. 17875494. 1, dated Apr. 2, 2020, 7 pages.
Notice of Preliminary Rejection from related Korean patent application No. 10-2019-77018518, dated Oct. 22, 2020, 7 pages.

* cited by examiner

| | | |
|---|---|---|
| 350-1 | RA-1 | CO-1 |
| 350-2 | RA-2 | CO-2 |
| 350-3 | RA-3 | CO-3 |
| 350-4 | RA-4 | CO-4 |
| 350-5 | RA-5 | CO-5 |
| 350-6 | RA-6 | CO-6 |
| 350-7 | RA-7 | CO-7 |
| 350-8 | RA-8 | CO-8 |
| 350-9 | RA-9 | CO-9 |
| 350-10 | RA-10 | CO-10 |
| 350-11 | RA-11 | CO-11 |
| 350-12 | RA-12 | CO-12 |
| 350-13 | RA-13 | CO-13 |
| 350-14 | RA-14 | CO-14 |

*Fig. 3*

MEMORY PROTOCOL

PRIORITY INFORMATION

This application is a continuation of U.S. application Ser. No. 16/812,719, filed on Mar. 9, 2020, which will issue as U.S. Pat. No. 11,226,770 on Jan. 18, 2022, which is a continuation of U.S. application Ser. No. 15/366,504, filed on Dec. 1, 2016, now granted as U.S. Pat. No. 10,585,624 on Mar. 10, 2020, the contents of which are incorporated herein by reference.

TECHNICAL FIELD

The present disclosure relates generally to memory devices, and more particularly, to apparatuses and methods for a memory protocol.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. Non-volatile memory may be used in, for example, personal computers, portable memory sticks, digital cameras, cellular telephones, portable music players such as MP3 players, movie players, and other electronic devices. Memory cells can be arranged into arrays, with the arrays being used in memory devices.

Memory can be part of a memory module (e.g., a dual in-line memory module (DIMM)) used in computing devices. Memory modules can include volatile, such as DRAM, for example, and/or non-volatile memory, such as Flash memory or RRAM, for example. The DIMMs can be using a main memory in computing systems.

BRIEF DESCRIPTION OF THE DRAWINGS

FIG. 3 is a diagram of a number of registers in accordance with a number of embodiments of the present disclosure.

DETAILED DESCRIPTION

Figure 1:
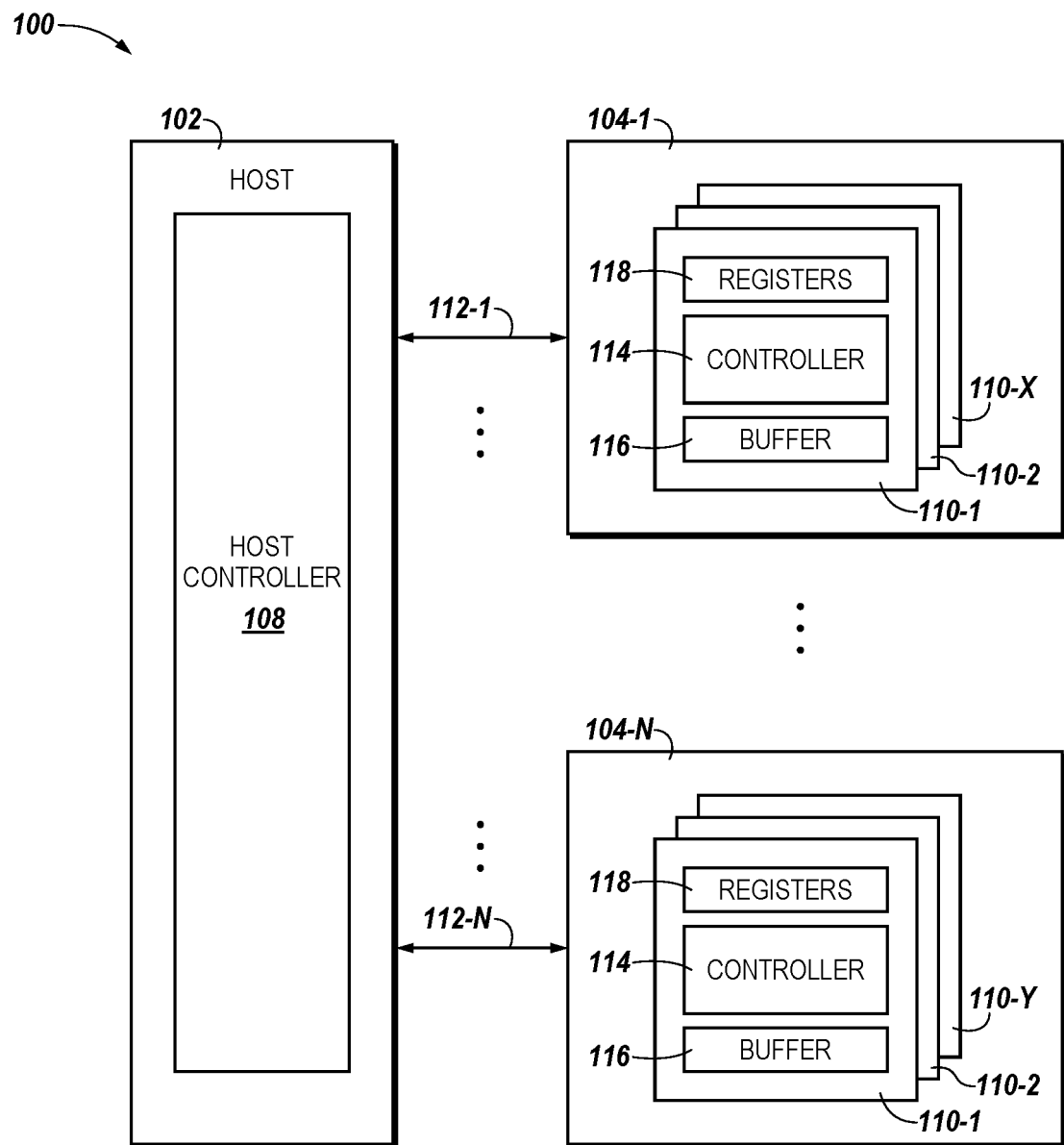
FIG. 1 is a block diagram of an apparatus in the form of a computing system including a memory system in accordance with a number of embodiments of the present disclosure.

The present disclosure includes apparatuses and methods related to a memory protocol. An example apparatus can execute a read command that includes a first chunk of data and a second chunk of data by assigning a first read identification (RID) number to the first chunk of data and a second RID number to the second chunk of data, sending the first chunk of data and the first RID number to a host, and sending the second chunk of data and the second RID number to the host.

In a number of embodiments, a read command can include a number of chunks of data and the chunks of data associated with the read command can be returned in a particular order. The order in which the chunks of data are returned can be indicated by settings in the memory device or by bits in the read command. Also, chunks of data associated with different read commands can be sent to the host consecutively or by interleaving chunks of data from different commands. The chunks of data associated with read commands can also be sent based on when the memory device has access to the data, so that a chunk that is accessed first is sent to the host first.

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designator "N" indicates that a number of the particular feature so designated can be included with a number of embodiments of the present disclosure.

As used herein, "a number of" something can refer to one or more of such things. For example, a number of memory devices can refer to one or more of memory devices. Additionally, designators such as "N", as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

FIG. 1 is a functional block diagram of a computing system 100 including an apparatus in the form of a number of memory systems 104-1 . . . 104-N, in accordance with one or more embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. In the embodiment illustrated in FIG. 1, memory systems 104-1 . . . 104-N can include a one or more dual in-line memory modules (DIMM) 110-1, . . . , 110-X, 110-Y. The DIMMs 110-1, . . . , 110-X, 110-Y can include volatile memory and/or non-volatile memory. In a number of embodiments, memory systems 104-1, . . . , 104-N can include a multi-chip device. A multi-chip device can include a number of different memory types and/or memory modules. For example, a memory system can include non-volatile or volatile memory on any type of a module. The examples described below in association with FIGS. 1-4 use a DIMM as the memory module, but the protocol of the present disclosure can be used on any memory system where memory can execute non-deterministic commands. In FIG. 1, memory system 104-1 is coupled to the host via channel 112-1 can include DIMMs 110-1, . . . , 110-X, where DIMM 110-1 is a NVDIMM and 110-X is DRAM DIMM. In this example, each DIMM 110-1, . . . , 110-X, 110-Y includes a controller 114. Controller 114 can received commands from host 102 and control execution of the commands on a DIMM. Also, in a number of embodiments, the protocol of the present disclosure could be implemented by a memory device (e.g., a DIMM) without a controller and execution of the commands using the protocol of the present disclosure could be built into the memory device. The host 102 can send commands to the DIMMs 110-1, . . . , 110-X, 110-Y using the protocol of the present disclosure and/or a prior protocol, depending on the type of memory in the DIMM. For example, the host can use the protocol of the present disclosure to communicate on the same channel (e.g., channel 112-1) with a NVDIMM and a prior protocol to communicate with a DRAM DIMM that are both on the same memory system. The host and the NVDIMM can communicate via read ready (R_RDY) signals, read send (R_SEND) signals, write credit increment (WC_INC) signals, and read identification (RID) signals according the protocol of the present disclosure. The read ready (R_RDY) signals, read send (R_SEND) signals, write credit increment (WC_INC) signals, and read identification (RID) signals can be sent via pins that are unused in a prior protocol (e.g. DDR4) or are pins from a prior protocol (e.g. DDR4) that are repurposed (e.g. used differently) so that the present protocol is compatible with the prior protocol. Also, pins can be assigned to the read ready (R_RDY) signals, read send (R_SEND) signals, write credit increment (WC_INC) signals, and read identification (RID) signals in protocols that are being developed (e.g., DDR5).

As illustrated in FIG. 1, a host 102 can be coupled to the memory systems 104-1 . . . 104-N. In a number of embodiments, each memory system 104-1 . . . 104-N can be coupled to host 102 via a channel. In FIG. 1, memory system 104-1 is coupled to host 102 via channel 112-1 and memory system 104-N is coupled to host 102 via channel 112-N. Host 102 can be a laptop computer, personal computers, digital camera, digital recording and playback device, mobile telephone, PDA, memory card reader, interface hub, among other host systems, and can include a memory access device, e.g., a processor. One of ordinary skill in the art will appreciate that "a processor" can intend one or more processors, such as a parallel processing system, a number of coprocessors, etc.

Host 102 includes a host controller 108 to communicate with memory systems 104-1 . . . 104-N. The host controller 108 can send commands to the DIMMs 110-1, . . . , 110-X, 110-Y via channels 112-1 . . . 112-N. The host controller 108 can communicate with the DIMMs 110-1, . . . , 110-X, 110-Y and/or the controller 114 on each of the DIMMs 110-1, . . . , 110-X, 110-Y to read, write, and erase data, among other operations. A physical host interface can provide an interface for passing control, address, data, and other signals between the memory systems 104-1 . . . 104-N and host 102 having compatible receptors for the physical host interface. The signals can be communicated between 102 and DIMMs 110-1, . . . , 110-X, 110-Y on a number of buses, such as a data bus and/or an address bus, for example, via channels 112-1 . . . 112-N.

The host controller 108 and/or controller 114 on a DIMM can include control circuitry, e.g., hardware, firmware, and/or software. In one or more embodiments, the host controller 108 and/or controller 114 can be an application specific integrated circuit (ASIC) coupled to a printed circuit board including a physical interface. Also, each DIMM 110-1, . . . , 110-X, 110-Y can include buffers 116 of volatile and/or non-volatile memory and registers 118. Buffer 116 can be used to buffer data that is used during execution of read commands and/or write commands. The buffer 116 can be split into a write buffer and a read buffer. The amount of space that is dedicated to the write buffer and the amount of space dedicated to the read buffer can be controlled by the host controller 108. The host can control the amount of space in the buffer 116 dedicated to the write buffer and the read buffer based on the type of commands that are being sent to a particular DIMM. In a number of embodiments, the DIMM can have a fixed write buffer size and/or a fixed read buffer size. Registers 118 can be programmed to set order in which chunks of data associated with a command will be returned to the host 102 by the DIMMs 110-1, . . . 110-X, 110-Y.

The DIMMs 110-1, . . . , 110-X, 110-Y can provide main memory for the memory system or could be used as additional memory or storage throughout the memory system. Each DIMM 110-1, . . . , 110-X, 110-Y can include one or more arrays of memory cells, e.g., non-volatile memory cells. The arrays can be flash arrays with a NAND architecture, for example. Embodiments are not limited to a particular type of memory device. For instance, the memory device can include RAM, ROM, DRAM, SDRAM, PCRAM, RRAM, and flash memory, among others.

The embodiment of FIG. 1 can include additional circuitry that is not illustrated so as not to obscure embodiments of the present disclosure. For example, the memory systems 104-1 . . . 104-N can include address circuitry to latch address signals provided over I/O connections through I/O circuitry. Address signals can be received and decoded by a row decoder and a column decoder to access the memory devices 110-1, . . . , 110-N. It will be appreciated by those skilled in the art that the number of address input connections can depend on the density and architecture of the DIMMs 110-1, . . . , 110-X, 110-Y.

Figure 2A:
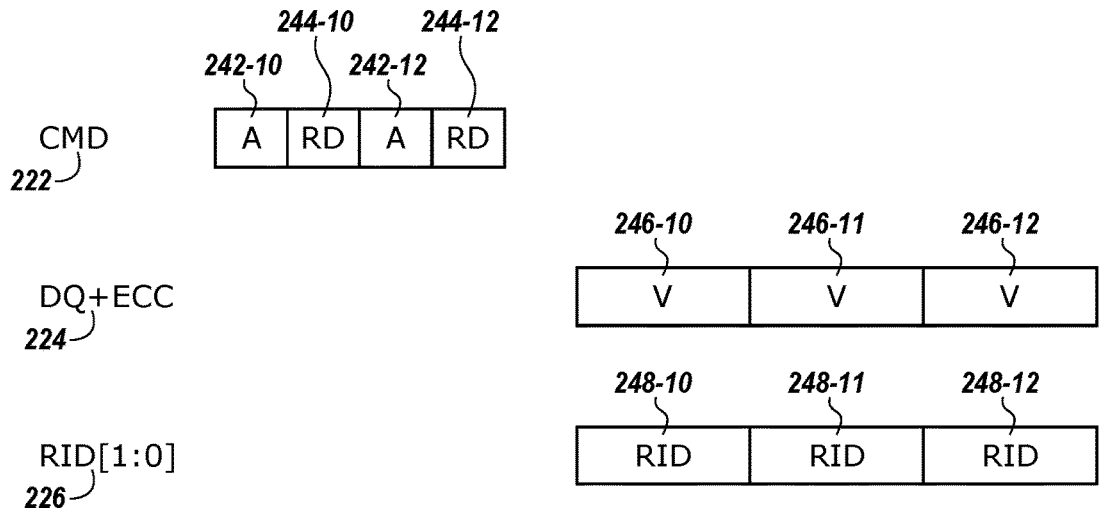
FIGS. 2A-2B are diagrams of a number of reads operations in accordance with a number of embodiments of the present disclosure.
Figure 2B:
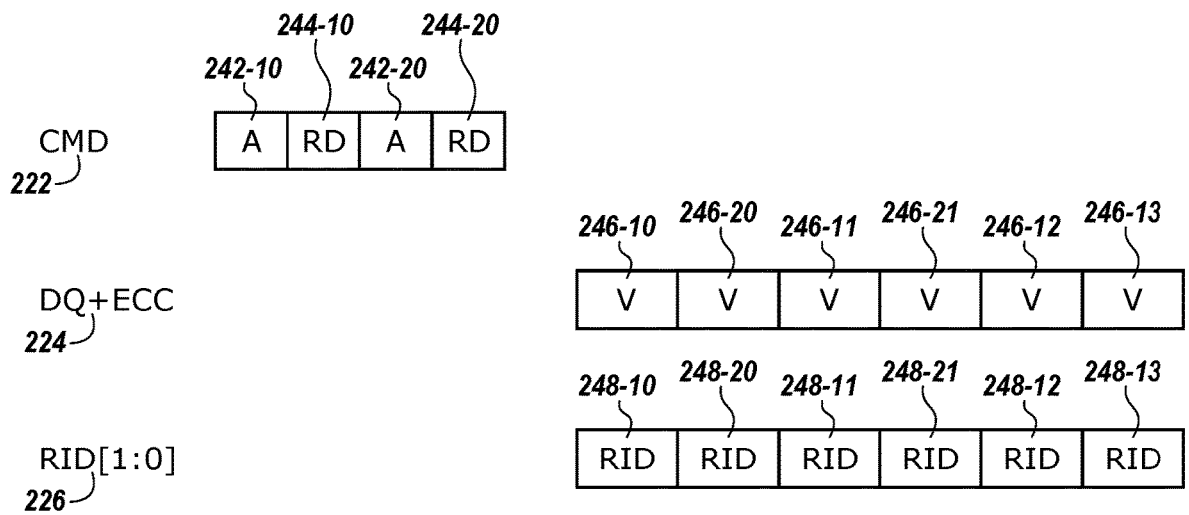

FIGS. 2A-2B are diagrams of a number of reads operations in accordance with a number of embodiments of the present disclosure. FIG. 2A illustrates an example of performing two read operations. A command signal 222 can be sent from the host to the NVDIMM. Command signal 222 can include activate commands and read commands. In FIG. 2A, a first activate command 242-10, a first read command 244-10, a second activate command 242-12, and a second read command 244-12 are sent from the host to the NVDIMM. The read commands can include an indication of a quantity of data that is associated with the commands (e.g., a number of chunks of data associated with the read command). For example, read command 244-10 can be associated with 2 64B chunks of data and read command 244-12 can be associated with 1 64B chunk of data. A chunk of data can be an amount of data that is transferred between a host and the NVDIMM. The host can assign a host read identification (RID) number to the read command. The host RID number can be included in the read command and transmitted to the NVDIMM when sending the read command from the host to the NVDIMM. In FIG. 2A, first read command 244-10 can be assigned a host RID of 10 and the second read command 244-12 can be assigned a host RID of 12. The host can assign host RID numbers by incrementing the previous assigned host RID number by a value equal to or greater than the quantity of the number of chunks of data associated with the previous read command. For example, in FIG. 2A, the first read command 244-10 was assigned a host RID of 10 and the second read command 244-12 was assigned a host RID of 12 because the read command was associated with two chunks of data. The NVDIMM will use a memory device RID of 11 for the second chunk of data associated with the first read command 244-10, so RID 11 was skipped by the host when assigning the second command 244-12 a host RID.

The read command can also include an indication of an order in which the chunks of data associated with the read commands are to be returned. The read command can include a register address, which the NVDIMM can use to locate a register that indicates an order in which to return the chunks of data associated with the read command. The read command can also include an indication that a particular chunk of data associated with the read command is to be returned with priority. For example, the read command can include an indication that a particular chunk of data, such as the second chunk and/or the chunk of data that was addressed in the read command, is to be returned first. Also, the read command can include an indication that the chunks of data are to be returned in an order based to when the NVDIMM accesses the chunks of data associated with the command. For example, if the third chunk of data associated with a read command is accessed first, then the third chunk of data is first returned to the host.

The read command can also include a number of bits, e.g., lower address bits, to indicate a priority associated with the command and an order in which to return the chunks of data. The bits, e.g., lower address bits, can indicate low or high priority, e.g., whether or not the chunks of data associated with the command should be return before chunks of data associated with other commands, and/or random or in order return of chunks of data. The bits, e.g., lower address bits, that indicate random return of chunks of data can also indicate that chunks of data are returned with a critical chunk priority, e.g., the critical chunk is returned first, or that chunks of data are returned on a first ready first returned basis. For example, when 3 bits are used to indicate priority and order, an address sequence of 000 can indicate low priority with in order return of data chunks, an address sequence of 001 can indicate low priority with random return of data chunks on a first ready first returned basis, an address sequence of 010 can indicate low priority with random return of data chunks with a critical chunk priority, an address sequence of 100 can indicate high priority with in order return of data chunks, an address sequence of 101 can indicate high priority with random return of data chunks on a first ready first returned basis, and an address sequence of 110 can indicate low priority with random return of data chunks with a critical chunk priority.

In a number of embodiments, the NVDIMM can also return chunks of data sequentially and/or interleaved, which can be programmed in a mode register of the NVDIMM. When return chunks sequentially, the first chunk of data associated with a command is returned first, the second chunk of data associated with a command is returned second, and so on. When interleaving chunks, a chunk of data associated with a particular command can be followed by a chunk associated with a different command.

In the protocol of the present disclosure, the read commands can be sent one after another without regard to timing parameters. This allows commands to be sent sooner than having to space the commands out due to clock timing parameters, therefore the NVDIMM can start processing the commands sooner which can reduce latency for the commands.

In FIG. 2A, once the NVDIMM has received the read commands 244-10 and 244-12, the NVDIMM can determine how many chunks of data are associated with the read commands 244-10 and 244-12. The NVDIMM can inspect the buffer and/or cache of the NVDIMM and in the non-volatile memory of the NVDIMM to locate the data associated with the read commands 244-10 and 244-12. Once the controller locates the data and has the data ready to send back to the host, the NVDIMM controller can send a read ready command to the host. When a NVDIMM receives a number of read commands, the NVDIMM controller returns chunks of data associated the read commands in an order based on an indication in the read commands and/or a setting on the NVDIMM. For example, if the read command includes a register address, the NVDIMM controller locates the register at that address which indicates the order in which the data associated with a read command is to be return.

In FIG. 2A, read command 244-10 can include a register address for a register that indicates the first chunk of data associated with the command is to be returned and then the second chunk of data associated with the command is to be returned. A read ready indicator can be sent to the host by toggling (e.g., transitioning) a read ready signal from low to high or high to low to indicate that the first chunk of data associated read command 244-10 is ready to be sent to the host. The host can detect the read ready indicator by detecting the transition of the read ready signal. In response to receiving the read ready indicator, the host can send a read send indicator to the NVDIMM controller to indicate that the host is ready to receive the data associated with the read command 244-10. The read send indicator can be sent by the host to the NVDIMM controller at any time and without regard to timing parameters. The host can control traffic on the data bus by timing when read send commands are sent to the NVDIMM controller. The read send indicator can include toggling a read send signal from low to high, which is detected by the NVDIMM controller. The NVDIMM controller can, in response to receiving the read send indicator, send the first chunk of data 246-10 associated with read command 244-10 on the DQ+ECC pins 224. Also, a read identification (RID) signal 248-10 is sent to the host on the RID pins 226 when the chunk of data 246-10 sent to the host. The RID signal 248-10 includes the memory device RID number assigned to the chunk of data by the NVDIMM and is used to identify the read command associated with the chunk of data 246-10 that is sent to the host. Data chunk 246-10 is assigned a memory device RID number of 10. Due to the NVDIMM command being able to respond to read commands in an order that is different to the order in which the read commands are received, the host will not know with which read command a particular data transmission is associated without the RID signal. The RID signal can include n-bits, where n is 1 or more bits. For example, the RID signal can be transmitted on a 2 bit RID bus. The number of outstanding reads the host can issue can be dependent on the number of bits in the RID signal, the number of beats in the data packet, and the number of reads the NVDIMM controller can support. For example, if the data burst is 8 beats and the RID signal is 2 bits, the number of outstanding reads that the host can issue is $2^{2*8}$=65,536. Also, a NVDIMM may have a register that can be read by the host to further restrict the number of outstanding read commands that the host can issue and the host can keep track of the number of outstanding reads that the host has issued.

A read ready indicator can be sent to the host by toggling (e.g., transitioning) a read ready signal from low to high or high to low to indicate that the second chunk of data associated read command 244-10 is ready to be sent to the host. The host can detect the read ready indicator by detecting the transition of the read ready signal. In response to receiving the read ready indicator, the host can send a read send indicator to the NVDIMM controller to indicate that the host is ready to receive the second chunk of data associated with the read command 244-10. The read send indicator can be sent by the host to the NVDIMM controller at any time and without regard to timing parameters. The host can control traffic on the data bus by timing when read send commands are sent to the NVDIMM controller. The read send indicator can include toggling a read send signal from low to high, which is detected by the NVDIMM controller. The NVDIMM controller can, in response to receiving the read send indicator, send the second chunk of data 246-11 associated with read command 244-10 on the DQ+ECC pins 224. Also, a read identification (RID) signal 248-12 is sent to the host on the RID pins 226 when the chunk of data 246-11 sent to the host. The RID signal 248-11 includes the memory device RID number assigned to the chunk of data by the NVDIMM and is used to identify the read command associated with the chunk of data 246-11 that is sent to the host. Data chunk 246-11 is assigned a memory device RID number of 11.

In a number of embodiments, a read send signal can be pulsed from low to high to low or a SEND command can be used to indicate that the host is ready to receive data. The pulsed read send signal can be timed by the host to coordinate with other signals sent to DIMMs on a common channel, which are typically captured with a clock edge, where some of the DIMMs may or may not be using the protocol of the present disclosure.

In response to receiving read command 244-12, a read ready indicator can be sent to the host by toggling the read ready signal from high to low to indicate that the chunk of data associated with read command 244-12 is ready to be sent to the host. The host can detect the read ready indicator by detecting the change in the read ready signal from high to low. In response to receiving the read ready indicator, the host can send a read send indicator to the NVDIMM controller to indicate that the host is ready to receive the chunk of data associated with the read command 224-12. The read send indicator can include toggling the read send signal from high to low, which is detected by the NVDIMM controller. The NVDIMM controller can, in response to receiving the read send indicator, send the chunk of data 246-12 associated with read command 244-12 on the DQ+ECC pins 224. Also, a read identification (RID) signal 248-2 is sent to the host on the RID pins 226 when the chunk of data 246-12 sent to the host. The RID signal 248-12 includes the memory device RID number assigned to the chunk of data by the NVDIMM and is used to identify the read command associated with the chunk of data 246-12 that is sent to the host. Data chunk 246-12 is assigned a memory device RID number of 12.

FIG. 2B illustrates an example of performing two read operations, where the chunks of data are interleaved with a critical chunk of each command being returned first. A command signal 222 can be sent from the host to the NVDIMM. Command signal 222 can include activate commands and read commands. In FIG. 2B, a first activate command 242-10, a first read command 244-10, a second activate command 242-20, and a second read command 244-20 are sent from the host to the NVDIMM. The read commands can include an indication of a quantity of data that is associated with the commands (e.g., a number of chunks of data associated with the read command). For example, read command 244-10 can be associated with 4 64B chunks of data and read command 244-20 can be associated with 2 64B chunks of data. A chunk of data can be an amount of data that is transferred between a host and the NVDIMM. The host can assign a host read identification (RID) number to the read command. The host RID number can be included in the read command and transmitted to the NVDIMM when sending the read command from the host to the NVDIMM. In FIG. 2A, first read command 244-10 can be assigned a host RID of 10 and the second read command 244-20 can be assigned a host RID of 20.

The read command can also include an indication of an order in which the chunks of data associated with the read commands are to be returned. Read command 242-10 and read command 242-20 can each include an indication that the first chunk of data associated with the read command (e.g., a critical chunk) is be returned first.

In FIG. 2B, once the NVDIMM has received the read commands 244-10 and 244-20, the NVDIMM can determine how many chunks of data are associated with the read commands 244-10 and 244-20. The NVDIMM can inspect the buffer and/or cache of the NVDIMM and in the non-volatile memory of the NVDIMM to locate the data associated with the read commands 244-10 and 244-20. Once the controller locates the data and has the data ready to send back to the host, the NVDIMM controller can send a read ready command to the host.

In FIG. 2A, transferring data to the host can begin by sending a read ready indicator to the host by toggling (e.g., transitioning) a read ready signal from low to high or high to low to indicate that the first chunk of data associated read command 244-10 is ready to be sent to the host. The host can detect the read ready indicator by detecting the transition of the read ready signal. In response to receiving the read ready indicator, the host can send a read send indicator to the NVDIMM controller to indicate that the host is ready to receive the data associated with the read command 244-10. The read send indicator can be sent by the host to the NVDIMM controller at any time and without regard to timing parameters. The host can control traffic on the data bus by timing when read send commands are sent to the NVDIMM controller. The read send indicator can include toggling a read send signal from low to high, which is detected by the NVDIMM controller. The NVDIMM controller can, in response to receiving the read send indicator, send the first chunk of data 246-10 associated with read command 244-10 on the DQ+ECC pins 224. Also, a read identification (RID) signal 248-10 is sent to the host on the RID pins 226 when the chunk of data 246-10 sent to the host. The RID signal 248-10 includes the memory device RID number assigned to the chunk of data by the NVDIMM and is used to identify the read command associated with the chunk of data 246-10 that is sent to the host. Data chunk 246-10 is assigned a memory device RID number of 10.

Transferring data to the host can continuing by sending a read ready indicator to the host by toggling (e.g., transitioning) a read ready signal from low to high or high to low to indicate that the first chunk of data associated read command 244-20 is ready to be sent to the host. The host can detect the read ready indicator by detecting the transition of the read ready signal. In response to receiving the read ready indicator, the host can send a read send indicator to the NVDIMM controller to indicate that the host is ready to receive the second chunk of data associated with the read command 244-20. The read send indicator can be sent by the host to the NVDIMM controller at any time and without regard to timing parameters. The read send indicator can include toggling a read send signal from low to high, which is detected by the NVDIMM controller. The NVDIMM controller can, in response to receiving the read send indicator, send the second chunk of data 246-20 associated with read command 244-20 on the DQ+ECC pins 224. Also, a read identification (RID) signal 248-20 is sent to the host on the RID pins 226 when the chunk of data 246-20 sent to the host. The RID signal 248-20 includes the memory device RID number assigned to the chunk of data by the NVDIMM and is used to identify the read command associated with the chunk of data 246-20 that is sent to the host. Data chunk 246-20 is assigned a memory device RID number of 20.

Once the first chunk of 246-10 associated with read command 244-20 and the second chunk of data associated with read command 244-20 have been sent to the host, the remaining chunks of data can be sent to the host interleaved. Transferring the remaining chunks of data associated with read commands 244-10 and 244-10 in an interleaved manner can continue by sending a read ready indicator to the host by toggling (e.g., transitioning) a read ready signal from low to high or high to low to indicate that the second chunk of data associated read command 244-10 is ready to be sent to the host. The host can detect the read ready indicator by detecting the transition of the read ready signal. In response to receiving the read ready indicator, the host can send a read send indicator to the NVDIMM controller to indicate that the host is ready to receive the second chunk of data associated with the read command 244-10. The read send indicator can be sent by the host to the NVDIMM controller at any time and without regard to timing parameters. The read send indicator can include toggling a read send signal from low to high, which is detected by the NVDIMM controller. The NVDIMM controller can, in response to receiving the read send indicator, send the second chunk of data 246-11 associated with read command 244-10 on the DQ+ECC pins 224. Also, a read identification (RID) signal 248-11 is sent to the host on the RID pins 226 when the chunk of data 246-11 sent to the host. The RID signal 248-11 includes the memory device RID number assigned to the chunk of data by the NVDIMM and is used to identify the read command associated with the chunk of data 246-11 that is sent to the host. Data chunk 246-11 is assigned a memory device RID number of 11.

Transferring the remaining chunks of data associated with read commands 244-10 and 244-20 in an interleaved manner can continue by sending a read ready indicator to the host by toggling (e.g., transitioning) a read ready signal from low to high or high to low to indicate that the second chunk of data associated read command 244-20 is ready to be sent to the host. The host can detect the read ready indicator by detecting the transition of the read ready signal. In response to receiving the read ready indicator, the host can send a read send indicator to the NVDIMM controller to indicate that the host is ready to receive the second chunk of data associated with the read command 244-20. The read send indicator can be sent by the host to the NVDIMM controller at any time and without regard to timing parameters. The read send indicator can include toggling a read send signal from low to high, which is detected by the NVDIMM controller. The NVDIMM controller can, in response to receiving the read send indicator, send the second chunk of data 246-21 associated with read command 244-20 on the DQ+ECC pins 224. Also, a read identification (RID) signal 248-21 is sent to the host on the RID pins 226 when the chunk of data 246-21 sent to the host. The RID signal 248-21 includes the memory device RID number assigned to the chunk of data by the NVDIMM and is used to identify the read command associated with the chunk of data 246-21 that is sent to the host. Data chunk 246-21 is assigned a memory device RID number of 21.

Transferring the remaining chunks of data associated with read commands 244-10 and 244-20 in an interleaved manner can continue by sending a read ready indicator to the host by toggling (e.g., transitioning) a read ready signal from low to high or high to low to indicate that the third chunk of data associated read command 244-10 is ready to be sent to the host. The host can detect the read ready indicator by detecting the transition of the read ready signal. In response to receiving the read ready indicator, the host can send a read send indicator to the NVDIMM controller to indicate that the host is ready to receive the third chunk of data associated with the read command 244-10. The read send indicator can be sent by the host to the NVDIMM controller at any time and without regard to timing parameters. The read send indicator can include toggling a read send signal from low to high, which is detected by the NVDIMM controller. The NVDIMM controller can, in response to receiving the read send indicator, send the third chunk of data 246-12 associated with read command 244-10 on the DQ+ECC pins 224. Also, a read identification (RID) signal 248-12 is sent to the host on the RID pins 226 when the chunk of data 246-12 sent to the host. The RID signal 248-12 includes the memory device RID number assigned to the chunk of data by the NVDIMM and is used to identify the read command associated with the chunk of data 246-12 that is sent to the host. Data chunk 246-12 is assigned a memory device RID number of 12.

Transferring the remaining chunks of data associated with read commands 244-10 and 244-20 in an interleaved manner can continue by sending a read ready indicator to the host by toggling (e.g., transitioning) a read ready signal from low to high or high to low to indicate that the fourth chunk of data associated read command 244-10 is ready to be sent to the host. The host can detect the read ready indicator by detecting the transition of the read ready signal. In response to receiving the read ready indicator, the host can send a read send indicator to the NVDIMM controller to indicate that the host is ready to receive the fourth chunk of data associated with the read command 244-10. The read send indicator can be sent by the host to the NVDIMM controller at any time and without regard to timing parameters. The read send indicator can include toggling a read send signal from low to high, which is detected by the NVDIMM controller. The NVDIMM controller can, in response to receiving the read send indicator, send the third chunk of data 246-13 associated with read command 244-10 on the DQ+ECC pins 224. Also, a read identification (RID) signal 248-13 is sent to the host on the RID pins 226 when the chunk of data 246-13 sent to the host. The RID signal 248-13 includes the memory device RID number assigned to the chunk of data by the NVDIMM and is used to identify the read command associated with the chunk of data 246-13 that is sent to the host. Data chunk 246-13 is assigned a memory device RID number of 13.

FIG. 3 is a diagram of a number of registers in accordance with a number of embodiments of the present disclosure. FIG. 3 includes registers 350-1, . . . , 350-14 having corresponding register addresses (RA-1, ..., RA-14) and chunk orders (CO-1, ..., CO-14). In a number of embodiments, any number of registers of any size can be used to determine an order in which to return chunks of data. Registers 350-1 and 350-2 can be addressed with 1 bit in a read command. Register 350-1 can include 6 bits and can be addressed to determine the order for returning chunks of data for commands having 2 chunks of data. Register 350-2 can include 6 bits and can be addressed to determine the order for returning chunks of data for commands having 3 chunks of data.

Registers 350-3, 350-4, 350-5, and 350-6 can be addressed with 2 bits in a read command. Register 350-3 can include 12 bits and can be addressed to determine the order for returning chunks of data for commands having 4 chunks of data. Register 350-4 can include 12 bits and can be addressed to determine the order for returning chunks of data for commands having 5 chunks of data. Register 350-5 can include 12 bits and can be addressed to determine the order for returning chunks of data for commands having 6 chunks of data. Register 350-6 can include 12 bits and can be addressed to determine the order for returning chunks of data for commands having 7 chunks of data.

Registers 350-7, 350-8, 350-9, 350-10, 350-11, 350-12, 350-13, 350-14 can be addressed with 3 bits in a read command. Register 350-7 can include 32 bits and can be addressed to determine the order for returning chunks of data for commands having 8 chunks of data. Register 350-8 can include 32 bits and can be addressed to determine the order for returning chunks of data for commands having 9 chunks of data. Register 350-9 can include 32 bits and can be addressed to determine the order for returning chunks of data for commands having 10 chunks of data. Register 350-10 can include 32 bits and can be addressed to determine the order for returning chunks of data for commands having 11 chunks of data. Register 350-11 can include 32 bits and can be addressed to determine the order for returning chunks of data for commands having 12 chunks of data. Register 350-12 can include 32 bits and can be addressed to determine the order for returning chunks of data for commands having 13 chunks of data. Register 350-3 can include 32 bits and can be addressed to determine the order for returning chunks of data for commands having 14 chunks of data. Register 350-15 can include 32 bits and can be addressed to determine the order for returning chunks of data for commands having 15 chunks of data.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   a memory device; and
   circuitry coupled to the memory device configured to:
   receive a read command that includes an indication of a quantity of data to be transferred; and
   execute the read command by sending a read ready signal to indicate a portion of data associated with the read command is ready before other portions of data associated with the read command are ready and by sending data associated with the read command and a data packet that includes a read identification (RID) number in response to sending the read ready signal and receiving a read send signal, wherein the data packet includes block identification information to indicate a number of chunks of data included in the portion of data associated with the read command that is being sent while executing the read command, wherein the portion of data indicated by the read ready signal is less than the quantity of data to be transferred by during execution of the read command.

2. The apparatus of claim 1, wherein the circuitry is configured to execute the read command by sending the read ready signal in response to receiving the read command.

3. The apparatus of claim 2, wherein the read ready signal indicates at least the portion of the data associated with the command is ready to send.

4. The apparatus of claim 1, wherein the circuitry is configured to execute the read command by sending the data associated with the command and the data packet in response to receiving a send command.

5. The apparatus of claim 1, wherein the data packet include write credit information.

6. The apparatus of claim 1, wherein the data packet includes error correction code (ECC) information.

7. The apparatus of claim 1, wherein the data packet includes block identification information to indicate a number of chunks of data included in the data associated with the command.

8. An apparatus, comprising:
   a memory device; and
   circuitry coupled to the memory device configured to:
   receive a read command that includes an indication of an order in which to return a plurality of portions of data associated with the read command;
   send a read ready command to indicate a first portion of the plurality of portions of data associated with the read command is ready to send before other portions of the plurality of portions of data associated with the read command are ready to send; and
   send a first portion of the plurality of portions of data associated with the read command and a data packet to a host in response to sending the read ready command and receiving a read send command from the host, wherein the data packet includes block identification information to indicate a number of chunks of data included in the first portion of the plurality of portions of data associated with the read command that is being sent while executing the read command, wherein the first portion of the plurality of portions of data indicated by the read ready command is less than a total quantity of data to be transferred by during execution of the read command.

9. The apparatus of claim 8, wherein the data packet includes a 10 bit read identification (RID) number.

10. The apparatus of claim 9, wherein the read command includes the RID number.

11. The apparatus of claim 8, wherein the circuitry is configured to receive a send command to indicate a host is ready to receive the data associated with the read command.

12. The apparatus of claim 8, wherein the data packet includes write credit information.

13. The apparatus of claim 8, wherein the data packet includes ECC information.

14. The apparatus of claim 8, wherein the data packet includes block identification information to indicate a number of chunks of data included in the data associated with the read command.

15. A method, comprising:
sending a read ready command in response to receive a read command requesting data to indicate a portion of data associated with the read command is ready before other portions of data associated with the read command are ready; and
sending the portion of the data associated with the read command and a data packet in response to sending the read ready command and in response to receiving an indication that a host is ready to receive the data associated with the read command, wherein the data packet includes block identification information to indicate a number of chunks of data included in the portion of the data associated with the read command that is being sent while executing the read command, wherein the portion of data indicated by the read ready command is less than a total quantity of data to be transferred during execution of the read command.

16. The method of claim 15, wherein sending the data packet includes sending a 10 bit read identification (RID) number.

17. The method of claim 15, further including sending the read ready command to indicate a memory device has the portion of the data associated with the read command ready to send.

18. The method of claim 15, further including receiving a send command to indicate the host is ready to receive the data associated with the read command.

19. The method of claim 15, wherein sending the data packet includes sending write credit information.

20. The method of claim 15, wherein sending the data packet includes sending ECC information.

* * * * *